Jan. 29, 1957     K. E. SCHREINER ET AL     2,779,940
AZIMUTH ERROR INDICATOR
Filed May 6, 1946
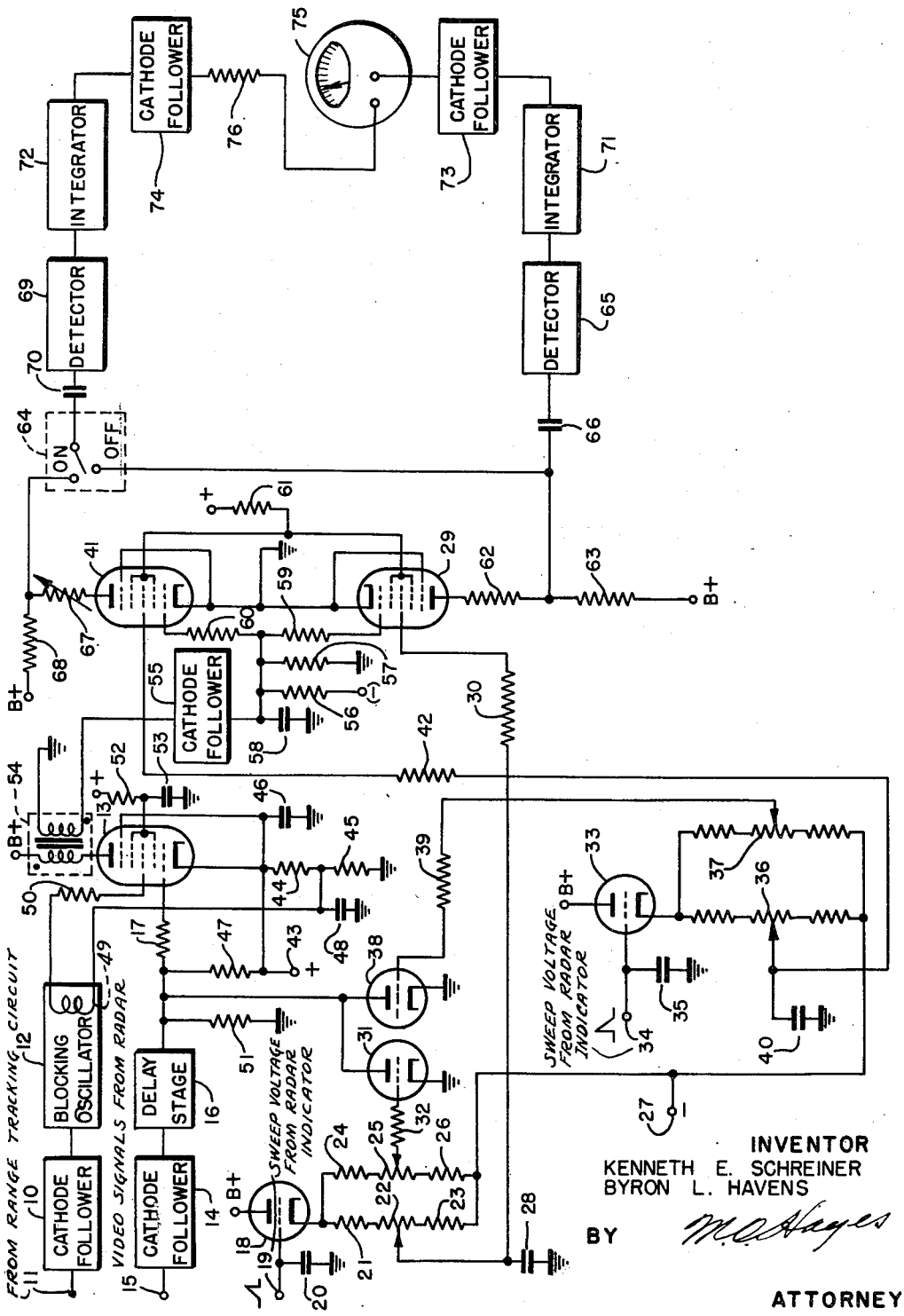
INVENTOR
KENNETH E. SCHREINER
BYRON L. HAVENS
BY
ATTORNEY

United States Patent Office 2,779,940
Patented Jan. 29, 1957

2,779,940
AZIMUTH ERROR INDICATOR

Kenneth E. Schreiner, Cambridge, Mass., and Byron L. Havens, New York, N. Y., assignors, by mesne assignments, to the United States of America as represented by the Secretary of the Navy Application May 6, 1946, Serial No. 667,704

10 Claims. (Cl. 343—16)

This invention relates to an indicator and more particularly to an indicator of azimuth error prevalent in aircraft bombing runs.

In the low altitude type of bombing attack, the success of the attack depends to a large extent upon how closely the bombardier can direct the attacking aircraft onto a "collision course" over the target. A "collision course" is maintained by the aircraft when it is on a heading such that the angle of sight to the target does not change as the run progresses. However, at best, slight changes in the angle, called azimuth error, will develop due to drift of the aircraft; a change of course by the target if it is moving; and/or other varying factors, including the human error. Heretofore, the "collision course" has been set up by the bombardier from the information he obtains from his radar indicator scope. He directs the aircraft on a certain heading and sets a vertical crosshair in the center of the target indication on his radar scope. If the target image drifts to the right or left of this azimuth crosshair, he corrects the heading to again center the target image under the crosshair. He repeats the process until there is no drift to right or left. It is apparent that this process is a series of approximations based upon the bombardier's own skill in interpreting radar information. As the aircraft closes with the target less and less time can be spared for making any essential heading changes, and there comes a time in the bombing run when no changes at all can be made if the run is to be successful. It is also apparent that the quicker any azimuth error can be detected, the better will be the results of the attack. Human faculties, which heretofore have evaluated the radar information concerning the azimuth position of the target, are relatively inaccurate.

It is an object of this invention to alleviate the above-mentioned difficulty.

It is another object of this invention to provide an indicator for determining errors in the azimuth positions of an aircraft with respect to an intended target.

Another object is to provide an electronically controlled azimuth error indicator.

Another object is to provide an azimuth error indicator which employs as the indicator, a meter which is electronically activated.

Still another object is to provide an azimuth error indicator for use in conjunction with radio detection and range finding apparatus.

A further object is to provide an azimuth error indicator which does not disturb the operation of the apparatus with which it is associated.

These and other objects will become apparent from the following specification when taken in conjunction with the accompanying drawing which is a combination partial block-partial schematic diagram of one embodiment of the invention.

In the drawing is disclosed a conventional cathode follower amplifier stage 10 which is connected to an input terminal 11. The output of this cathode follower stage 10 feeds into a conventional blocking oscillator stage 12 whose output is fed onto a grid of a multi-grid electron tube 13, through transformer winding 49 and resistor 50.

A second conventional cathode follower amplifier stage 14 is coupled to a second input terminal 15. The output of this second cathode follower stage 14 feeds into a conventional delay stage 16 whose output is coupled to a second grid of tube 13 through resistor 17.

An electron tube 18 is also connected as a cathode follower amplifier. Its control grid is tied to input terminal 19 which is capacitively connected to ground through capacitor 20. The cathode of tube 18 is connected to a negative source of voltage at terminal 27 through a resistor network comprising: resistor 21, potentiometer 22, and resistor 23 in series; resistor 24, potentiometer 25, and resistor 26 in series; and these two identical series combinations connected in parallel. The movable contact arm of potentiometer 22, which is bypassed to ground through capacitor 28, is coupled to a grid of electron tube 29 through resistor 30. The movable contact arm of potentiometer 25 is coupled to the control grid of electron tube 31 through resistor 32.

Electron tube 33 is connected as a cathode follower amplifier, with its control grid tied to input terminal 34 and one lead of capacitor 35, the other lead of which is grounded. The cathode of tube 33 is connected to a second resistor network identical to the resistor network to which the cathode of tube 18 is tied. Potentiometers 36 and 37 are parts of this second resistance network. The movable contact of potentiometer 37 is coupled to the control grid of electron tube 38 through resistor 39. The movable contact of potentiometer 36, which is bypassed to ground by capacitor 40, is coupled to a grid of electron tube 41 through resistor 42. The two resistor networks mentioned above are tied to a common source of negative voltage at terminal 27.

The cathode of tube 13 is tied: directly to a source of positive voltage at terminal 43; directly to one end of resistor 44 whose other end connects to resistor 45; directly to a grid of tube 13; to one terminal of capacitor 46 whose other terminal is grounded; and to the control grid of tube 13 through resistors 47 and 17 in series. The other end of resistor 45 is grounded. The junction point of resistors 44 and 45, which is bypassed to ground by capacitor 48, is coupled through transformer winding 49 and resistor 50 to the same grid which receives the output from blocking oscillator stage 12. One end of resistor 51 is joined to the junction point of resistors 47 and 17 and its other end is grounded. This same junction point is joined to the output of delay stage 16 and directly to the plates of tubes 31 and 38 which are tied together.

Two other grids of tube 13 are tied together and connected to a source of positive voltage through resistor 52. They are also bypassed to ground by capacitor 53. The plate of tube 13 connects to a source of positive voltage through the primary side of output pulse transformer 54 whose secondary provides the input to a conventional cathode follower stage 55.

The output of cathode follower stage 55 is connected to the junction point of resistors 56 and 57 which are connected in series between a source of negative voltage and ground. Their junction point is bypassed to ground through capacitor 58. The control grids of tubes 29 and 41 are coupled to the last-mentioned junction point through resistors 59 and 60 respectively. The cathodes of both tubes 29 and 41 are tied directly to ground. Tube 29 has two of its grids connected together and tied to a source of positive voltage through resistor 61. Two grids of tube 41 also are coupled to the same source of positive voltage through the same resistor 61. Tubes 29 and 41 each have a grid tied to their respective cathodes. The plate of tube 29 is coupled to B+ voltage through resistors 62 and 63 in series. The junction point of resistors 62 and 63 is tied directly to the "off" terminal of switch 64 and is also coupled to a conventional detector stage 65 through capacitor 66. The plate of tube 41 is coupled to B+ voltage through variable resistor 67 and fixed resistor 68 in series. The junction point of resistors 67 and 68 is tied to the "on" terminal of switch 64. The contact arm of switch 64 is coupled to a conventional detector stage 69 through capacitor 70. With switch 64 "on" the output from tube 41 feeds detector stage 69 but with the switch 64 "off," output from tube 29 feeds both detector stages 65 and 69.

The output from both detector stages 65 and 69 feed into conventional integrating or averaging circuits—the output from 65 feeding into integrating circuit 71 and the output of 69 feeds into similar integrating circuit 72. The output of integrating stage 71 feeds onto the grid of conventional cathode follower stage 73 and similarly the output of integrating circuit 72 feeds onto the grid of conventional cathode follower stage 74. One terminal of an output meter 75 is coupled to the output of cathode follower stage 74 through a current limiting resistor 76, while the other terminal of meter 75 ties directly to the output of cathode follower stage 73.

In operation, four voltages are required from the low altitude bombing equipment with which this embodiment is associated. These four voltages are: (a) a positive pulse from the range tracking circuit, (b) video signal voltages, (c) an increasing sawtooth azimuth sweep voltage, and (d) a reverse sawtooth voltage i. e. one which has a sharp rise and then decreases linearly with time. Voltages (c) and (d) are derived from the sweep voltages that are fed onto the horizontal deflecting plates of the low altitude bombing equipment scope, which gives a pattern known to the art as B scope presentation. B scope presentation plots range along the vertical coordinates of the screen and azimuth along the horizontal coordinate. Voltages (c) and (d) are synchronized with the antenna sweep so as to correlate the target image position with antenna pointing direction.

The positive pulse of voltage from the range tracking circuit is fed into the cathode follower stage 10 through input terminal 11. The output from stage 10, also a positive pulse of voltage, triggers the blocking oscillator stage 12 into operation. The output from stage 12 is a pulse or "gate" of approximately two microseconds duration which is coupled onto a grid of tube 13.

The video voltages are fed into a cathode follower stage 14 by way of input terminal 15. Since it is desired that these video signals reach tube 13 during the same time as the gate from the blocking oscillator 12, the output from stage 14 has to be put through a conventional delay circuit 16 because there is a slight delay in starting the range-gate blocking oscillator 12. A delay of approximately one and a half microseconds is sufficient to center the signal within the two microsecond range gate. Two microseconds are equivalent approximately to 1000 ft. in range. This "gating" takes place in tube 13, called a coincidence tube. The aforementioned ascending sweep voltage is applied by way of input terminal 19 to the grid of electron tube 18 which tube is connected as a cathode follower. Coincident with this, the other sweep voltage with the sharp leading edge and descending magnitude is applied by way of input terminal 34 to the grid of electron tube 33 also connected as a cathode follower. Electron tubes 31 and 38 are normally non-conducting being biased to cut off by the negative voltage from terminal 27. They do not affect the control grid of coincidence tube 13 when they are cut off. But when the sweep voltage with the sharp leading edge is applied to the grid of tube 33, the voltage appearing across the resistance network in the cathode circuit of tube 33 becomes positive enough to overcome the bias voltage on the grid of tube 38, causing it to start conducting. The conduction of tube 38 causes the voltage on the control grid of tube 13 to drop, cutting tube 13 off. Sometime soon thereafter the output from tube 33 has dropped below the value of negative bias from terminal 27 and tube 38 is cut off. Meanwhile the ascending voltage being applied to the grid of tube 18 has not produced a positive enough output in the cathode circuit of tube 18 to overcome the negative bias on tube 31, so for a short time, adjusted to equal 10° of azimuth sweep of the LAB (low altitude bombing) equipment antenna, both tubes 31 and 38 are non-conducting. But even during the 10° sweep when the control grid of tube 13 is at its least negative value with respect to its cathode, tube 13 is still non-conducting. It will remain so until the two microsecond range gate, coming from the blocking oscillator, drives a second grid of tube 13 more positive. The combination of range gate and azimuth gate is needed to make tube 13 conduct. Only those video signals arriving at the coincidence tube 13 during its short period of conduction will be amplified. All others will not be passed by this stage. At the end of the 10° sweep, the ascending voltage output from tube 18 has become large enough to cause tube 31 to conduct, thereby dropping the grid voltage of tube 13 and again cutting it off. Hence, the coincidence tube discriminates against all signals which lie outside an area approximately 1000 ft. long and 10° wide.

The output from the coincidence tube 13 is coupled into a conventional cathode follower stage 55 through pulse transformer 54. The output from cathode follower stage 55, in the form of a positive pulse, is stretched by the action of capacitor 58 and resistor 57 and fed simultaneously to the control grids of both tube 29 and tube 41. Tubes 29 and 41 are the beginning stages of the process whereby azimuth resolution evolves at meter 75. The meter circuit is fed by two separate channels, one to each of its terminals. The outputs from cathode follower stages 73 and 74, which directly control the meter indicator, are so adjusted that when no azimuth error exists, they are of equal magnitude and therefore keep the indicator at its zero or central position. In order for the indicator to move to left or right, thus indicating left or right azimuth error, it becomes necessary to unbalance the outputs from cathode followers 73 and 74. This is readily done by changing the bias on the grids of these two stages. Since the grids of cathode followers 73 and 74 are fed by the output from similar averaging circuits, 71 and 72 respectively, it is obvious that if the average output from averaging stage 71 changes to be different than that of 72, the output from cathode follower 73 will change to be different than that of 74 and the meter needle will be deflected in a direction away from its center position. It will deflect in the opposite direction if the average output from stages 71 and 72 are unbalanced in the opposite direction to the first mentioned change. Since the foregoing is true, it becomes apparent that some method of controlling the average output from similar integrating circuits 71 and 72 must be employed and furthermore there must be direct correlation between these outputs and the relative position of the target with respect to the azimuth sweep of the LAB antenna. This is the function of tubes 29 and 41. Both of these tubes are biased to cut off in their quiescent state. But the same positive output from tube 33 which overcomes the bias on tube 38, also overcomes the bias on tube 41 and causes it to become conducting. It will be in conduction before tube 29. Therefore any video signals fed to its control grid at this time will be amplified. The degree of amplification is greatest at the beginning of the sweep voltage being applied from the cathode circuit of tube 33 and will decrease as the sweep voltage decreases. This has the effect of making the output from tube 41 larger the nearer the video (target) signals are to the beginning of the sweep and decreasingly smaller as the sweep progresses. Tube 29 works just the opposite, because the sweep voltage applied to it starts low and increases as it progresses. Tube 29 will be nonconducting at the beginning of this increasing sweep and will be cut on only when the output from the cathode circuit of tube 18 is large enough to overcome the bias. Therefore any video signals applied to the control grid of tube 29 at the beginning of the sweep will not be amplified, but will be at some time later and the longer the sweep progresses, the greater will be the degree of amplification. This serves to make the output of tube 29 greater the nearer the video (target) signals are to the end of the sweep. Tubes 29 and 41 are so biased that any video signals applied to the control grids at the middle of the sweep will be amplified equally by each tube, resulting in equal outputs. The output from tube 29 is coupled through capacitor 66 into detector stage 65 whose output is averaged by stage 71. The output from tube 41 is feed into detector stage 69 through capacitor 70 and its output is averaged by stage 72. The output from 71 is fed onto the control grid of cathode follower 73 and similarly the output from 72 is fed onto the control grid of cathode follower 74. Video signals appearing at the center of the sweep, then, will produce equal voltages at cathode follower stages 73 and 74 and, therefore, will not unbalance the meter circuit. Since the sweep is synchronized with the LAB antenna, such a result would indicate that no azimuth error existed. If, however, video signals appeared at the beginning of the sweep, or at any time up to the middle, the averaged output from tube 41 will cause the voltage on the grid of cathode follower 74 to be greater than that on the grid of cathode follower 73 and the meter circuit would be unbalanced in one direction. If video signals appeared at any time between the middle of the sweep and the end, the output from tube 29 would result in the meter circuit being unbalanced in the other direction.

It is to be noted that the sweep voltages applied to terminals 19 and 34 occur simultaneously and are of the same duration. Their period of duration is long compared to that of the 10° azimuth gate. Also, it is to be noted that the four voltages from the LAB equipment are fed into four cathode follower stages 10, 14, 18, and 33. Cathode followers present a characteristic high input impedance which serves to electrically isolate the input circuits from any loading effects by ensuing output circuits.

This invention is to be limited only by the appended claims.

What is claimed is:

1. In combination with a radar system having an antenna the directivity axis of which scans an azimuthal sector and in which is generated a voltage which varies linearly in response to the movement of said directivity axis between the azimuthal limits of said sector, apparatus for measuring the deviation of a craft on which said radar system is mounted from a collision course with a selected target, said apparatus comprising, a first amplifier, means for coupling video pulses from said radar system to said first amplifier, means for biasing said amplifier to amplify only video pulses representative of targets at substantially the same range as said desired target, means biasing said amplifier for response within an azimuthal sector narrower than the sector scanned by said antenna, second and third amplifiers, means for coupling the output of said first amplifier to said second and third amplifiers, means for controlling the gain of said second and third amplifiers in direct and inverse proportion respectively to said linearly varying voltage, and means for indicating the comparative output of said second and third amplifiers.

2. In combination with a radar system having an antenna the directivity axis of which scans an azimuthal sector and in which is generated a voltage which varies linearly in response to the movement of said directivity axis between the azimuthal limits of said sector, apparatus for measuring the deviation of a craft on which said radar is mounted from a collision course with a selected target, said apparatus comprising, a first amplifier, means for applying video signals from said radar system to said amplifier, means for gating said amplifier to amplify only video pulses from targets at the range of the desired target, means operative in response to said linearly varying voltage for biasing said first amplifier to amplify only video pulses representative of targets in a limited azimuth sector, second and third amplifiers, means for coupling the output of said first amplifier to said second and third amplifiers, means for controlling the gain of said second and third amplifiers in direct and inverse proportion respectively to said linearly varying voltage, and means coupled to said second and third amplifiers for indicating the difference in the outputs thereof.

3. In combination with a radar system having an antenna the directivity axis of which scans in azimuthal sector and in which is generated a voltage which varies linearly in response to the movement of said directivity axis between the azimuthal limits of said sector, apparatus for measuring the deviation of a craft on which said radar is mounted from a collision course with a selected target, said apparatus comprising, a first amplifier, means for applying video signals from said radar system to said first amplifier, means for gating said first amplifier to amplify only video pulses from targets at a range substantially equal to the range of said selected target, a pair of discharge devices operative in response to said linearly varying voltage arranged to bias said first amplifier to amplify only video pulses representative of targets within an azimuthal sector narrower than the sector scanned by said antenna, second and third amplifiers, means for applying the output of said first amplifier to said second and third amplifiers, means for controlling the gain of said second and third amplifiers in direct and inverse proportion to the azimuthal position of the directivity axis of said antenna, and means coupled to said second and third amplifiers and operative in response to the difference in the outputs thereof for indicating the deviation of said craft from said collision course.

4. In combination with a radar system having an antenna the directivity axis of which scans an azimuthal sector and in which is generated a voltage which varies linearly in response to the movement of said directivity axis between the azimuthal limits of said sector, apparatus for measuring the deviation of a craft on which said radar is mounted from a collision course with a selected target, said apparatus comprising, a first amplifier, means for applying video signals from said radar system to said first amplifier, means for gating said first amplifier to amplify only video pulses from targets at a range substantially equal to the range of said selected target, a pair of discharge devices operative in response to said linearly varying voltage arranged to bias said first amplifier to amplify only video pulses representative of targets within an azimuthal sector narrower than the sector scanned by said antenna, second and third amplifiers, means for applying the output of said first amplifier to said second and third amplifiers, means for controlling the gain of said second and third amplifiers in direct and inverse proportion respectively to the azimuthal position of the directivity axis of said antenna, means coupled to said second and third amplifiers for respectively averaging the outputs thereof, and a meter operative in response to the output of said last-mentioned means for indicating the deviation of said craft from said collision course.

5. In combination with a radar system having an antenna the directivity axis of which scans an azimuthal sector and in which is generated a voltage which varies linearly in response to the movement of said directivity axis between the azimuthal limits of said sector, apparatus for measuring the deviation of a craft on which said radar is mounted from a collision course with a selected target, said apparatus comprising, a first amplifier, means for applying video signals from said radar system to said first amplifier, means for gating said first amplifier to amplify only video pulses from targets at a range substantially equal to the range of said selected target, a pair of discharge devices operative in response to said linearly varying voltage arranged to bias said first amplifier to amplify only video pulses representative of targets within an azimuthal sector narrower than the sector scanned by said antenna, second and third amplifiers, means for applying the output of said first amplifier to said second and third amplifiers, means for controlling the gain of said second and third amplifiers in direct and inverse proportion respectively to the azimuthal position of the directivity axis of said antenna, first and second integrating circuits respectively coupled to said second and third amplifiers for averaging the outputs of said second and third amplifiers, and a meter coupled to said integrating circuits and operative in response to the difference in the outputs thereof for indicating the deviation of said craft from said collision course.

6. In combination with a radar system having an antenna the directivity axis of which scans an azimuthal sector and in which is generated a voltage which varies linearly with the movement of said directivity axis between the azimuth limits of said sector, apparatus for measuring the deviation of a craft on which said radar system is mounted from a collision course with a selected target, said apparatus comprising, a first amplifier, means for coupling video pulses from said radar system to said amplifier, means for biasing said amplifier to amplify only video pulses representative of targets at substantially the same range as said desired target and within an azimuthal sector narrower than the sector scanned by said antenna, second and third normally nonconducting amplifiers, means for coupling the output of said first amplifier to said second and third amplifiers, means for applying said linearly varying voltage with opposite polarity to bias said second and third amplifiers, whereby said second amplifier strongly amplifies signals from targets appearing at one side of the center line of said sector and said third amplifier strongly amplifies signals from targets appearing at the other side of the center line of said sector, said second and third amplifiers equally amplifying signals from targets appearing on the center line of said sector, and means coupled to said second and third amplifiers for indicating the comparative outputs of said second and third amplifiers.

7. In combination with a radar system having an antenna the directivity axis of which scans an azimuthal sector and in which is generated a voltage which varies linearly with the movement of said directivity axis between the azimuth limits of said sector, apparatus for measuring the deviation of a craft on which said radar system is mounted from a collision course with a selected target, said apparatus comprising, an amplifier, means for applying video signals from said radar system to said amplifier, means for biasing said amplifier to amplify only video pulses representative of said selected target, second and third amplifiers normally biased to nonconduction, means for coupling the output of said first amplifier to said second and third amplifiers, means for applying said linearly varying voltage with opposite polarity to bias said second and third amplifiers, whereby in response to said linearly varying voltage they respectively strongly amplify video signals representative of targets appearing at opposite sides of the center line of the aforesaid sector and equally amplify video signals from targets appearing on the center line of said sector, and means coupled to said second and third amplifiers operative in response to the difference in the outputs thereof for indicating the deviation of said craft from said collision course.

8. In combination with a radar system having an antenna the directivity axis of which scans an azimuthal sector and in which is generated a voltage which varies linearly with the movement of said directivity axis between the azimuth limits of said sector, apparatus for measuring the deviation of a craft on which said radar system is mounted from a collision course with a selected target, said apparatus comprising, a first amplifier, means for applying video signals from said radar system to said first amplifier, means for gating said first amplifier to amplify only video pulses from targets at a range substantially equal to the range of said selected target, a pair of discharge devices operative in response to the aforesaid voltage arranged to bias said first amplifier to amplify only video pulses representative of targets within an azimuthal sector narrower than the sector scanned by said antenna, second and third normally nonconducting amplifiers, means for applying the output of said first amplifier to said second and third amplifiers, means for applying said linearly varying voltage with opposite polarity to bias said second and third amplifiers, whereby in response to said linearly varying voltage they respectively strongly amplify signals representative of targets appearing at opposite sides of the center line of the aforesaid sector and equally amplify signals representative of targets appearing on said center line, and means coupled to said second and third amplifiers and operative in response to the difference in the outputs thereof for indicating the deviation of said craft from said collision course.

9. In combination with a radar system having an antenna the directivity axis of which scans an azimuthal sector and in which is generated a voltage which varies linearly with the movement of said directivity axis between the azimuth limits of said sector, apparatus for measuring the deviation of a craft on which said radar system is mounted from a collision course with a selected target, said apparatus comprising, a first amplifier, means for applying video signals from said radar system to said first amplifier, means for gating said first amplifier to amplify only video pulses from targets at a range substantially equal to the range of said selected target, a pair of discharge devices operative in response to the aforesaid voltage arranged to bias said first amplifier to amplify only video pulses representative of targets within an azimuthal sector narrower than the sector scanned by said antenna, second and third normally nonconducting amplifiers, means for applying the output of said first amplifier to said second and third amplifiers, means for applying said linearly varying voltage with opposite polarity to bias said second and third amplifiers, whereby in response to said linearly varying voltage they respectively strongly amplify signals representative of targets appearing at opposite sides of the center line of the aforesaid sector and equally amplify signals representative of targets appearing on said center line, means coupled to said second and third amplifiers for respectively averaging the outputs thereof, and a meter operative in response to the output of said last-mentioned means for indicating the deviation of said craft from said collision course.

10. In combination with a radar system having an antenna the directivity axis of which scans an azimuthal sector and in which is generated a voltage which varies linearly with the movement of said directivity axis between the azimuth limits of said sector, apparatus for measuring the deviation of a craft on which said radar system is mounted from a collision course with a selected target, said apparatus comprising, a first amplifier, means for applying video signals from said radar system to said first amplifier, means for gating said first amplifier to amplify only video pulses from targets at a range substantially equal to the range of said selected target, a pair of discharge devices operative in response to the aforesaid voltage arranged to bias said first amplifier to amplify only video pulses representative of targets within an azimuthal sector narrower than the sector scanned by said antenna, second and third normally nonconducting amplifiers, means for applying the output of said first amplifier to said second and third amplifiers, means for applying said linearly varying voltage with opposite polarity to bias said second and third amplifiers, whereby upon the application of said linearly varying voltage they respectively strongly amplify signals representative of targets appearing at opposite sides of the center line of the aforesaid sector and equally amplify signals representative of targets appearing on said center line, first and second integrating circuits respectively coupled to said second and third amplifiers for averaging the outputs of said second and third amplifiers, and a meter coupled to said integrating circuits and operative in response to the difference in the outputs thereof for indicating the deviation of said craft from said collision course.

References Cited in the file of this patent

UNITED STATES PATENTS

| | | |
|---|---|---|
| 2,406,358 | Doba | Aug. 27, 1946 |
| 2,416,088 | Deerhake | Feb. 18, 1947 |
| 2,532,566 | Millman | Dec. 5, 1950 |